United States Patent
Wiegman

(10) Patent No.: US 12,286,017 B2
(45) Date of Patent: Apr. 29, 2025

(54) SYSTEM AND METHODS FOR AN IMMEDIATE SHUTDOWN OF CHARGING FOR AN ELECTRIC AIRCRAFT

(71) Applicant: BETA AIR, LLC, South Burlington, VT (US)

(72) Inventor: Herman Wiegman, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 703 days.

(21) Appl. No.: 17/562,144

(22) Filed: Dec. 27, 2021

(65) Prior Publication Data

US 2023/0136952 A1 May 4, 2023

Related U.S. Application Data

(63) Continuation-in-part of application No. 17/515,448, filed on Oct. 30, 2021, now Pat. No. 11,735,932.

(51) Int. Cl.
*B60L 53/302* (2019.01)
*B60L 3/00* (2019.01)
*B60L 58/12* (2019.01)
*B64C 29/00* (2006.01)
*B64D 27/24* (2006.01)

(52) U.S. Cl.
CPC ............ *B60L 3/0046* (2013.01); *B60L 58/12* (2019.02); *B64C 29/0025* (2013.01); *B64D 27/24* (2013.01); *B60L 2200/10* (2013.01); *B64D 2221/00* (2013.01)

(58) Field of Classification Search
CPC ....... H02J 7/0031; H02J 7/0036; B60L 53/62; B60L 53/14; B60L 53/305; B60L 3/0046; B60L 2200/10; B60L 53/302; B60L 58/12; B64C 29/0025; B64D 27/24; B64D 2221/00
USPC ........................................................ 320/109
See application file for complete search history.

(56) References Cited

U.S. PATENT DOCUMENTS

| | | | |
|---|---|---|---|
| 6,152,597 A | 11/2000 | Potega | |
| 6,803,746 B2 | 10/2004 | Aker et al. | |
| 8,193,773 B2 | 6/2012 | Vasselin et al. | |
| 9,828,093 B2 | 11/2017 | Raniere | |
| 9,937,808 B2 | 4/2018 | Evans | |
| 2011/0266996 A1* | 11/2011 | Sugano | B60L 3/04 320/104 |

(Continued)

OTHER PUBLICATIONS

Plaza, Solving the Challenge of Multiple Drones and Hundreds of Batteries, May 31, 2018.

(Continued)

*Primary Examiner* — Nathaniel R Pelton
(74) *Attorney, Agent, or Firm* — Hoffman Warnick LLC

(57) ABSTRACT

The present invention is a system and methods for an immediate shutdown of charging for an electric vehicle charger. The system may include a sensor, which is communicatively connected to a charging connection, and a control circuit, which is communicatively connected to the sensor. If a disruption element is determined by the control circuit as a function of a charging datum of the sensor, then control circuit is configured to conduct an immediate shutdown of charger by disabling a communication of a charging connection to prevent harm to an electric vehicle, a charger, and/or a user.

16 Claims, 6 Drawing Sheets

(56) References Cited

U.S. PATENT DOCUMENTS

| | | | |
|---|---|---|---|
| 2013/0134938 A1* | 5/2013 | Bianco | B60L 53/18 |
| | | | 320/109 |
| 2017/0015208 A1* | 1/2017 | Dunlap | B60L 50/15 |
| 2019/0214854 A1 | 7/2019 | Leem | |
| 2019/0296565 A1* | 9/2019 | Connolly | H02H 5/04 |
| 2020/0182943 A1 | 6/2020 | Lim et al. | |
| 2021/0138923 A1* | 5/2021 | Hähre | B60L 3/0069 |
| 2022/0309931 A1* | 9/2022 | T | G08G 5/0026 |

OTHER PUBLICATIONS

Jiang, An Autonomous Landing and Charging System for Drones, Dec. 31, 2019.

* cited by examiner

SYSTEM AND METHODS FOR AN IMMEDIATE SHUTDOWN OF CHARGING FOR AN ELECTRIC AIRCRAFT

CROSS-REFERENCE TO RELATED APPLICATIONS

This application is a continuation-in-part of Non-provisional application Ser. No. 17/515,448 filed on Oct. 30, 2021 and entitled "SYSTEM AND METHODS FOR AN IMMEDIATE SHUTDOWN OF AN ELECTRIC VEHICLE CHARGER," the entirety of which is incorporated herein by reference.

FIELD OF THE INVENTION

The present invention generally relates to the field of charging systems for electric vehicles. In particular, the present invention is directed to a system and methods for an immediate shutdown of charging for an electric vehicle.

BACKGROUND

Electric vehicles allow for a quiet and efficient experience, while not requiring fossil fuels. As infrastructure around charging electric vehicles grows, it is critical to ensure the proper operation of electric vehicle chargers for safety purposes.

SUMMARY OF THE DISCLOSURE

In an aspect, a system for an immediate shutdown of charging for an electric vehicle may include a sensor communicatively connected to an electric vehicle charging connection between a charger and an electric vehicle, wherein the sensor is configured to: identify a communication of the charging connection; detect a charging characteristic of the communication, and generate a charging datum based on the charging characteristic; and a control circuit communicatively connected to: the sensor; the control circuit configured to receive the charging datum of the sensor; determine a disruption element as a function of the charging datum; and disable the charging connection based on the disruption element.

In another aspect, a method for an immediate shutdown of an charging for an electric vehicle may include: identifying, by a sensor communicatively connected to an electric vehicle charging connection, a communication between a charger and an electric vehicle; detecting, by the sensor, a charging characteristic of the communication; generating, by the sensor, a charging datum based on the charging characteristic; receiving, by a control circuit communicatively connected to the sensor, the charging datum of the sensor; determining, by the control circuit, a disruption element as a function of the charging datum; and disabling, by the control circuit, the charger connection based on the disruption element.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
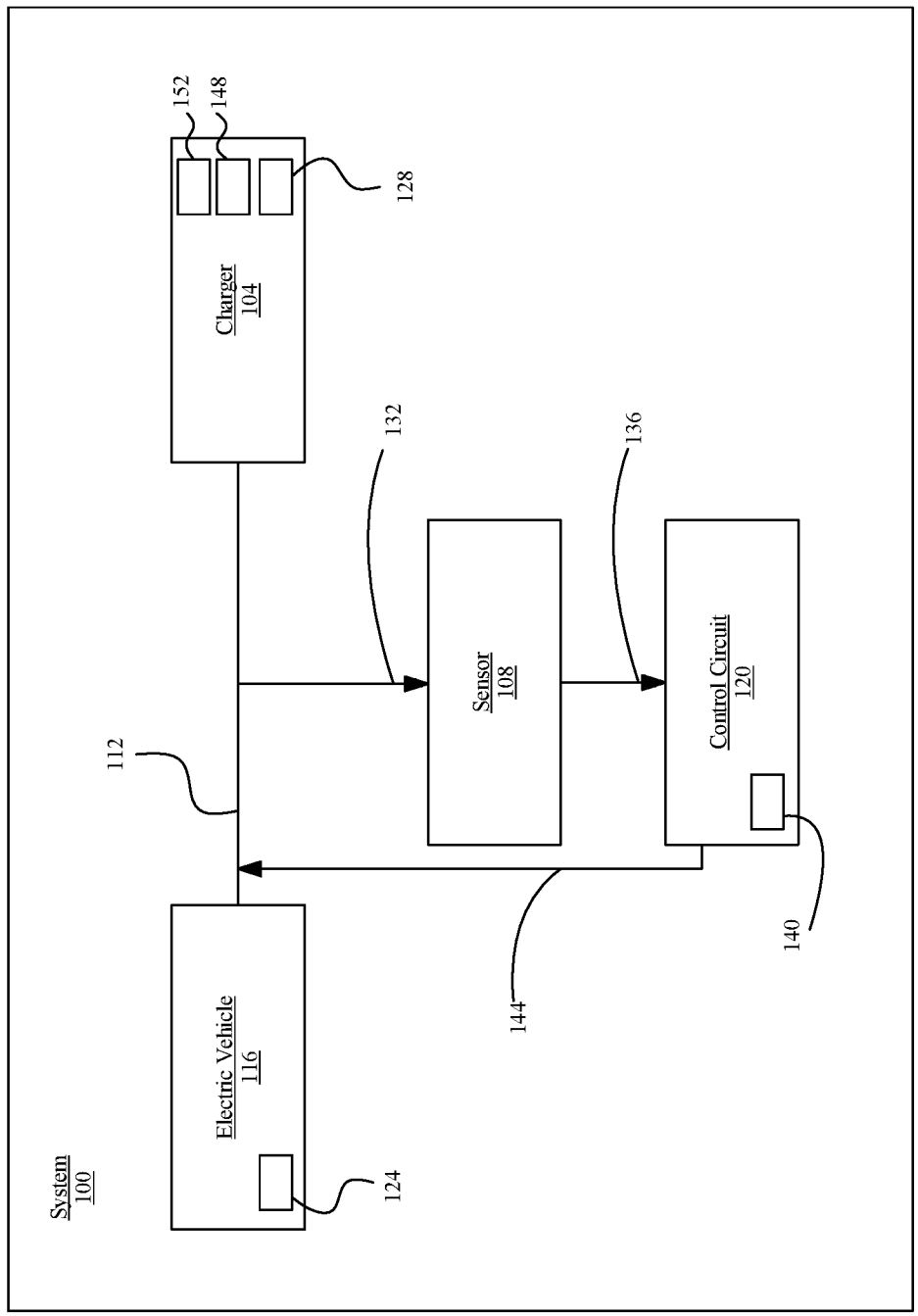
FIG. 1 is a block diagram of an exemplary embodiment of a system for an immediate shutdown of charging for electric vehicle in accordance with aspects of the invention thereof.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to a system and methods for an immediate shutdown of charging for an electric vehicle. More specifically, aspects of the present disclosure can be used to monitor and provide safety measures during the process of charging an electric vehicle. In an embodiment, aspects relate specifically to a sensor communicatively connected to an electric vehicle charging connection between a charger and an electric vehicle. The sensor may transmit detected charging datum to a control circuit, which may shutdown the charging connection if a disruption element is determined as a function of the charging datum. connector for interfacing with an electric vehicle for recharging. An immediate shutdown of an charging the electric vehicle may prevent catastrophic failure of and/or damage to a the batteries of an electric vehicle and/or charger. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Referring now to FIG. 1, a system 100 for an immediate shutdown of charging for an electric vehicle 116 is illustrated in accordance with one or more embodiments of the present disclosure. In one or more embodiments, system 100 includes a sensor 108 communicatively connected to an electric vehicle charging connection 112 between an electric vehicle charger 104 (also referred to herein as a "charger") and an electric vehicle 116. In one or more embodiments, sensor 108 is configured to identify a communication of electric vehicle charging connection 112 (also referred to herein as a "charging connection") between charger 104 and electric vehicle 116. For instance, and without limitation, sensor 108 may recognize that a charging connection has been created between charger 104 and electric vehicle 116 that facilitates communication between charger 104 and electric vehicle 116. For example, and without limitation, sensor 108 may identify a change in current through electric vehicle port, indicating connector is in electric communication with, for example, a charger 104, as discussed further below. For the purposes of this disclosure, a "charging connection" is a connection associated with charging a power source, such as, for example, a battery. Charging connection 112 may be a wired or wireless connection, as discussed further below in this disclosure. Charging connection 112 may include a communication between charger 104 and electric vehicle 116. For example, and without limitation, one or more communications between charger 104 and electric vehicle 116 may be facilitated by charging connection 112. As used in this disclosure, "communication" is an attribute where two or more relata interact with one another, for example, within a specific domain or in a certain manner. In some cases, communication between two or more relata may be of a specific domain, such as, and without limitation, electric communication, fluidic communication, informatic communication, mechanic communication, and the like. As used in this disclosure, "electric communication" is an attribute wherein two or more relata interact with one another by way of an electric current or electricity in general. For example, and without limitation, a communication between charger 104 and electric vehicle 116 may include an electric communication. As used in this disclosure, a "fluidic communication" is an attribute wherein two or more relata interact with one another by way of a fluidic flow or fluid in general. For example, and without limitation, a coolant may flow between charger 104 and electric vehicle 116 when there is a charging connection between charger 104 and electric vehicle 116. As used in this disclosure, "informatic communication" is an attribute wherein two or more relata interact with one another by way of an information flow or information in general. As used in this disclosure, "mechanic communication" is an attribute wherein two or more relata interact with one another by way of mechanical means, for instance mechanic effort (e.g., force) and flow (e.g., velocity).

In one or more embodiments, communication of charging connection 112 may include various forms of communication. For example, and without limitation, an electrical contact without making physical contact, for example, by way of inductance, may be made between charger 104 and electric vehicle 116 to facilitate communication. Exemplary conductor materials include metals, such as without limitation copper, nickel, steel, and the like. In one or more embodiments, a contact of charger 104 may be configured to provide electrical communication with a mating component within a port of electric vehicle 116. In one or more embodiments, contact may be configured to mate with an external connector. As used in this disclosure, a "connector" is a distal end of a tether or a bundle of tethers, e.g., hose, tubing, cables, wires, and the like, which is configured to removably attach with a mating component, for example without limitation a port. As used in this disclosure, a "port" is an interface for example of an interface configured to receive another component or an interface configured to transmit and/or receive signal on a computing device. For example, in the case of an electric vehicle port, the port interfaces with a number of conductors and/or a coolant flow path by way of receiving a connector. In the case of a computing device port, the port may provide an interface between a signal and a computing device. A connector may include a male component having a penetrative form and port may include a female component having a receptive form, receptive to the male component. Alternatively or additionally, connector may have a female component and port may have a male component. In some cases, connector may include multiple connections, which may make contact and/or communicate with associated mating components within port, when the connector is mated with the port.

With continued reference to FIG. 1, sensor 108 may include one or more sensors. As used in this disclosure, a "sensor" is a device that is configured to detect an input and/or a phenomenon and transmit information related to the detection. For example, and without limitation, a sensor may transduce a detected charging phenomenon and/or characteristic, such as, and without limitation, temperature, voltage, current, pressure, and the like, into a sensed signal. Sensor 108 may detect a plurality of data about charging connection 112, electric vehicle 116, and/or charger 104. A plurality of data about, for example, charging connection 112 may include, but is not limited to, battery quality, battery life cycle, remaining battery capacity, current, voltage, pressure, temperature, moisture level, and the like. In one or more embodiments, and without limitation, sensor 108 may include a plurality of sensors. In one or more embodiments, and without limitation, sensor 108 may include one or more temperature sensors, voltmeters, current sensors, hydrometers, infrared sensors, photoelectric sensors, ionization smoke sensors, motion sensors, pressure sensors, radiation sensors, level sensors, imaging devices, moisture sensors, gas and chemical sensors, flame sensors, electrical sensors, imaging sensors, force sensors, Hall sensors, and the like. Sensor 108 may be a contact or a non-contact sensor. For instance, and without limitation, sensor 108 may be connected to electric vehicle 116, charger 104, and/or a control circuit 120. In other embodiments, sensor 108 may be remote to electric vehicle 116, charger 104, and/or control circuit 120. As discussed further in this disclosure below, control circuit 120 may include a computing device, a processor, a pilot control, a controller, such as a flight controller, and the like. In one or more embodiments, sensor 108 may transmit/receive signals to/from control circuit 120. Signals may include electrical, electromagnetic, visual, audio, radio waves, or another undisclosed signal type alone or in combination.

Sensor 108 may include a plurality of independent sensors, where any number of the described sensors may be used to detect any number of physical or electrical quantities associated with communication of charging connection 112. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 108 to detect phenomenon may be maintained.

Still referring to FIG. 1, sensor 108 may include a motion sensor. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 108 may include, torque sensor, gyroscope, accelerometer, torque sensor, magnetometer, inertial measurement unit (IMU), pressure sensor, force sensor, proximity sensor, displacement sensor, vibration sensor, among others.

In some embodiments, sensor 108 may include a pressure sensor. A "pressure", for the purposes of this disclosure, and as would be appreciated by someone of ordinary skill in the art, is a measure of force required to stop a fluid from expanding and is usually stated in terms of force per unit area. In non-limiting exemplary embodiments, a pressure sensor may be configured to measure an atmospheric pressure and/or a change of atmospheric pressure. In some embodiments, a pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, a pressure sensor may be configured to transform a pressure into an analogue electrical signal. In some embodiments, the pressure sensor may be configured to transform a pressure into a digital signal.

In one or more embodiments, sensor 108 may include a moisture sensor. "Moisture", as used in this disclosure, is the presence of water, which may include vaporized water in air, condensation on the surfaces of objects, or concentrations of liquid water. Moisture may include humidity. "Humidity", as used in this disclosure, is the property of a gaseous medium (almost always air) to hold water in the form of vapor.

In one or more embodiments, sensor 108 may include electrical sensors. Electrical sensors may be configured to measure voltage across a component, electrical current through a component, and resistance of a component. In one or more embodiments, sensor 108 may include thermocouples, thermistors, thermometers, infrared sensors, resistance temperature sensors (RTDs), semiconductor based integrated circuits (ICs), a combination thereof, or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor 108, may be measured in Fahrenheit (° F.), Celsius (° C.), Kelvin (° K), or another scale alone or in combination. The temperature measured by sensors may comprise electrical signals, which are transmitted to their appropriate destination wireless or through a wired connection.

In some embodiments, sensor 108 may include a plurality of sensing devices, such as, but not limited to, temperature sensors, humidity sensors, accelerometers, electrochemical sensors, gyroscopes, magnetometers, inertial measurement unit (IMU), pressure sensor, proximity sensor, displacement sensor, force sensor, vibration sensor, air detectors, hydrogen gas detectors, and the like. Sensor 108 may be configured to detect a plurality of data, as discussed further below in this disclosure. A plurality of data may be detected from charger 104, charging connection 112, and/or electric vehicle 116 via a communication of charging connection 112.

In some embodiments, a plurality of data may be detected from an environment of electric vehicle 116. A plurality of data may include, but is not limited to, airborne particles, weather, temperature, air quality, and the like. In some embodiments, airborne particles may include hydrogen gas and/or any gas that may degrade a battery of electric vehicle 116. Sensor 108 may detect a plurality of data about a power source 124 of electric vehicle 116.

Figure 2:
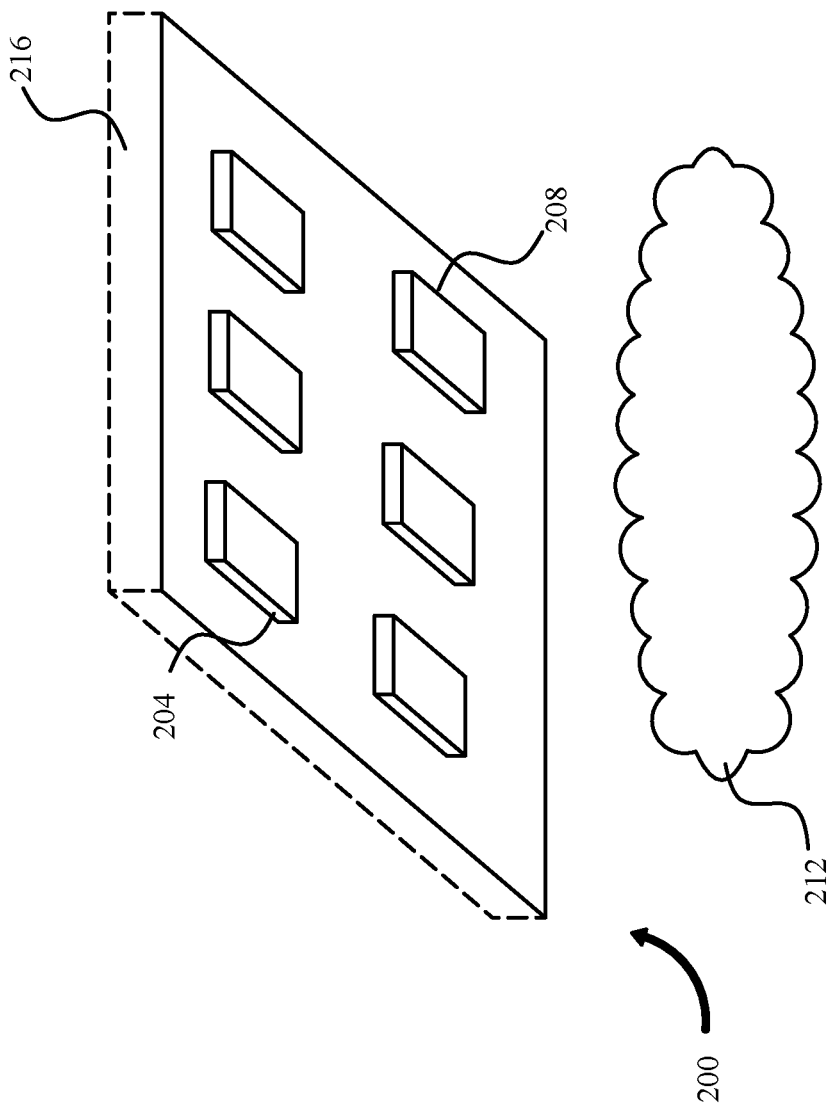
FIG. 2 is a diagrammatic representation of an exemplary embodiment of a sensor suite in accordance with aspects of the invention thereof.

In one or more embodiments, sensor 108 may include a sensor suite which may include a plurality of sensors that may detect similar or unique phenomena, as discussed further in FIG. 2. For example, in a non-limiting embodiment, a sensor suite may include a plurality of voltmeters or a mixture of voltmeters and thermocouples. System 100 may include a plurality of sensors in the form of individual sensors or a sensor suite working in tandem or individually. A sensor suite may include a plurality of independent sensors, as described in this disclosure, where any number of the described sensors may be used to detect any number of physical or electrical quantities associated with a charging connection. Independent sensors may include separate sensors measuring physical or electrical quantities that may be powered by and/or in communication with circuits independently, where each may signal sensor output to a control circuit such as control circuit 120. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

In one or more embodiments, sensor 108 may include a sense board. A sense board may have at least a portion of a circuit board that includes one or more sensors configured to, for example, measure a temperature of power source 124 of electric aircraft 116 and/or power source 128 of charger 104. In one or more embodiments, a sense board may be connected to one or more battery modules or cells of a power source. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

Still referring to FIG. 1, sensor 108 is configured to detect a charging characteristic 132 of a communication. As used in this disclosure, a "sensor" is a device that is configured to detect an input and/or a phenomenon and transmit information related to the detection. For example, and without limitation, a sensor may transduce a detected phenomenon, such charging characteristic 132. As used in this disclosure, a "charging characteristic" is a detectable phenomenon associated with charging a power source. In one or more embodiments, a charging characteristic includes temperature, voltage, current, pressure, moisture, and the like. In one or more embodiments, sensor 108 may be configured to detect charging characteristic 132 of a communication between charger 104 and electric vehicle 116 and then transmit a sensor output signal representative of charging characteristic 132, where the sensor signal includes a charging datum 136. As used in this disclosure, a "sensor signal" is a representation of a charging characteristic 132 that sensor 108 may generate. Sensor signal may include charging datum 136. For instance, and without limitation, sensor 108 is configured to generate charging datum 136 of a communication. For the purposes of this disclosure, a "charging datum" is an electronic signal representing a quantifiable element of data correlated to a charging characteristic. For example, and without limitation, power source 124 of electric vehicle 116 may need to be a certain temperature to operate properly; charging datum 136 may provide a numerical value, such as a temperature in degrees, that indicates the current temperature of a charging power source. For example, and without limitation, sensor 108 may be a temperature sensor that detects the temperature of a power source of electric vehicle 116 to be at a numerical value of 100° F. and transmits the corresponding charging datum to, for example, control circuit 120. In another example, and without limitation, sensor 108 may be a current sensor and a voltage sensor that detects a current value and a voltage value, respectively, of a power source of an electric vehicle. Such charging datum may be associated with an operating condition of power sources 124,128 such as, for example, a state of charge (SoC) or a depth of discharge (DoD) of the power source. For example, and without limitation, charging datum 136 may include, for example, a temperature, a state of charge, a moisture level, a state of health (or depth of discharge), or the like. A sensor signal may include any signal form described in this disclosure, for example digital, analog, optical, electrical, fluidic, and the like. In some cases, a sensor, a circuit, and/or a controller may perform one or more signal processing steps on a signal. For instance, sensor, circuit, and/or controller may analyze, modify, and/or synthesize a signal in order to improve the signal, for instance by improving transmission, storage efficiency, or signal to noise ratio.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

In one or more embodiments, sensor 108 may include sensors configured to measure charging characteristics 132, such as physical and/or electrical parameters related to charging connection 112. For example, and without limitation, sensor 108 may measure temperature and/or voltage, of battery modules and/or cells of a power source of electric vehicle 116 and/or charger 104. Sensor 108 may be configured to detect failure within each battery module, for instance and without limitation, as a function of and/or using detected charging characteristics. In one or more exemplary embodiments, battery cell failure may be characterized by a spike in temperature; sensor 108 may be configured to detect that increase in temperature and generate a corresponding signal, such as charging datum 136 of the communication. In other exemplary embodiments, sensor 108 may detect voltage and direct the charging of individual battery cells according to charge level. Detection may be performed using any suitable component, set of components, and/or mechanism for direct or indirect measurement and/or detection of voltage levels, including without limitation comparators, analog to digital converters, any form of voltmeter, or the like.

Still referring to FIG. 1, control circuit 120 is configured to receive charging datum 136 from sensor 108. Control circuit 120 may receive charging datum via a wired or wireless communication between control circuit 120 and sensor 108. In one or more embodiments, control circuit 120 is configured to determine a disruption element as a function of the received charging datum 136. For purposes of this disclosure, a "disruption element" is an element of information regarding a present-time failure, fault, or degradation of a condition or working order of a charging connection. In one or more embodiments, disruption element 140 may be determined as a function of charging datum 136, as discussed further in this disclosure.

In one or more embodiments, outputs, such as charging datum 136, from sensor 108 or any other component present within system 100 may be analog or digital. Onboard or remotely located processors can convert those output signals from sensor 108 or sensor suite to a usable form by the destination of those signals, such as control circuit 120. The usable form of output signals from sensors, through processor may be either digital, analog, a combination thereof, or an otherwise unstated form. Processing may be configured to trim, offset, or otherwise compensate the outputs of sensor suite. Based on sensor output, the processor can determine the output to send to downstream component. Processor can include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components. In some embodiments sensor 108 may be configured to communicate charging datum 136, for instance, by way of network. Exemplary charging datum may include charging characteristics, for example, represented by way of at least a sensor signal. In some cases, charging datum may include one or more of a state of charge of a power source, a temperature of a power source, any other metric associated with power source health, temperature of ambient air, cost of electricity consumed, and the like.

Still referring to FIG. 1, control circuit 120 is configured to disable charging connection 112 based on disruption element 140. In one or more embodiments, if an immediate shutdown via a disablement of charging connection 112 is initiated, then control circuit 120 may also generate a signal to notify users, support personnel, safety personnel, flight crew, maintainers, operators, emergency personnel, aircraft computers, or a combination thereof. System 100 may include a display. A display may be coupled to electric vehicle 116, charger 104, or a remote device. A display may be configured to show a disruption element to a user. In one or more embodiments, control circuit 120 may be configured to disable charging connection 112 based on disruption element 140. For instance, and without limitation, control circuit 120 may be configured to detect a charge reduction event, defined for purposes of this disclosure as any temporary or permanent state of a battery cell requiring reduction or cessation of charging. A charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature of the cell above a preconfigured threshold, detection of a voltage and/or resistance level above or below a preconfigured threshold, or the like.

In one or more embodiments, disruption element 140 may indicate a power source 124,128 of electric aircraft 116 and/or charger 104, respectively, is operating outside of an acceptable operation condition represented by a preconfigured threshold (also referred to herein as a "threshold"). For the purposes of this disclosure, a "threshold" is a set desired range and/or value that, if exceeded by a value of charging datum, initiates a specific reaction of control circuit 120. A specific reaction may be, for example, a disablement command 144, which is discussed further below in this disclosure. Threshold may be set by, for example, a user or control circuit based on, for example, prior use or an input. In one or more embodiments, if charging datum 136 is determined to be outside of a threshold, disruption element 140 is determined by control circuit 120 and disablement command 144 is generated. For example, and without limitation, charging datum 136 may indicate that a power source 124 of electric vehicle 116 and/or power source 128 of charger 104 has a temperature of 100° F. Such a temperature may be outside of a preconfigured threshold of, for example, 75° F. of an operational condition, such as temperature, of a power source and thus charging connection 112 may be disabled by control circuit 120 to prevent overheating of or permanent damage to power source 124,128. For the purposes of this disclosure, a "disablement command" is a signal transmitted to an electric vehicle and/or a charger providing instructions and/or a command to disable and/or terminate a charging connection between an electric vehicle and a charger. Disabling charging connection 112 may include terminating a communication between electric vehicle 116 and charger 104. For example, and without limitation, disabling charging connection 112 may include terminating a power supply to charger 104 so that charger 104 is no longer providing power to electrical vehicle 116. In another example, and without limitation, disabling charging connection 112 may include electrical vehicle 116 severing the electrical connection between electrical vehicle 116 and charger 104. In another example, and without limitation, disabling charging connection 112 may include terminating a power supply to electric vehicle 116. In another example, and without limitation, disabling charging connection 112 may include using a relay or switch between charger 112 and vehicle 116 to terminate charging connection and/or a communication between charger 112 and vehicle 116.

Still referring to FIG. 1, as previously mentioned in this disclosure, system 100 may include control circuit 120. In one or more exemplary embodiments, control circuit may include a computing device. A computing device may include any computing device as described in this disclosure, including without limitation a microcontroller, processor, microprocessor, flight controller, digital signal processor (DSP), and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, in some cases, control circuit 120 is configured to receive charging datum 136 of sensor 108. As previously mentioned, sensor 108 detects a charging characteristic 132 of a communication of charging connection 112. A corresponding sensor signal that includes charging datum 136 is then generated and transmitted by sensor 108 to control circuit 120. Once control circuit 120 receives charging datum 136, control circuit 120 determines a disruption element 140 as a function of the charging datum 136. For instance, and without limitation, a disruption element may include a charging failure of electric vehicle 116. For example, and without limitation, sensor 108 may detect an amount of current so high that control circuit 120 determines that a charging failure as a function of the received charging datum 136. In one or more embodiments, control circuit 120 is configured to disable charging connection 112 based on determined disruption element 140. For example, and without limitation, after determining a disruption element, control circuit 120 may generate a control signal, such as disablement command 144, providing instructions to an electric vehicle 116, charger 104, a relay or switch of charging connection 112, or the like, to disable a communication and/or charging connection 112. In another example, control circuit 120 may directly disable charging connection 112. In one or more embodiments, control circuit 120 is configured to stop charging by terminating an electrical communication between electric vehicle 116 and charger 104.

Still referring to FIG. 1, charger 104 may include power source 128, which may supply electrical energy to power source 124 of electric vehicle 116. As used in this disclosure, a "charger" is an electrical system and/or circuit that increases electrical energy in an energy store, for example a battery. In one or more embodiments, charger 104 includes a charging component that is configured to supply power to electric vehicle 116. For example, and without limitation, charger 104 may supply power to power source 124 of electric vehicle 116. For example, and without limitation, charger 104 may be configured to charge and/or recharge a plurality of electric aircrafts at a time. As used in this disclosure, "charging" is a process of flowing electrical charge in order to increase stored energy within a power source. In one or more non-limiting exemplary embodiments, a power source includes a battery and charging includes providing an electrical current to the battery. In some embodiments, charger 104 may be constructed from any of variety of suitable materials or any combination thereof. In some embodiments, charger 104 may be constructed from metal, concrete, polymers, or other durable materials. In one or more embodiments, charger 104 may be constructed from a lightweight metal alloy. In some embodiments, charger 104 may be included a charging pad. The charging pad may include a landing pad, where the landing pad may be any designated area for the electric vehicle to land and/or takeoff. In one or more embodiments, landing pad may be made of any suitable material and may be any dimension. In some embodiments, landing pad may be a helideck or a helipad. In one or more embodiments, charger 104 may be in electric communication with a power converter and power source, such as a battery of electric vehicle 116. In some cases, charger 104 may be configured to charge power source 124 with an electric current from a power converter. In some cases, charger 104 may include one or electrical components configured to control flow of an electrical recharging current, such as without limitation switches, relays, direct current to direct current (DC-DC) converters, and the like. In some case, charger 104 may include one or more circuits configured to provide a variable current source to provide electrical charging current, for example an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In some cases, one or more circuits within charger 104 or within communication with charger 104 are configured to affect electrical recharging current according to control signal from, for example, a controller. For instance, and without limitation, a controller may control at least a parameter of the electrical charging current. For example, in some cases, controller may control one or more of current (Amps), potential (Volts), and/or power (Watts) of electrical charging current by way of control signal. In some cases, controller may be configured to selectively engage electrical charging current, for example ON or OFF by way of control signal. In one or more embodiments, disablement command 144 from control circuit 120 may be received by controller, which, in response, may, for example, terminate power to charger 104.

Still referring to FIG. 1, for the purposes of this disclosure, a "power source" is a device and/or component used to store and provide electrical energy to, for example, an electric vehicle or another power source. For example, and without limitation, power sources 124,128 may be a battery and/or a battery pack having one or more battery modules or battery cells. In some cases, power source 128 may include a charging battery (i.e. a battery used for charging other batteries). A charging battery is notably contrasted with an electric vehicle battery, which is located, for example, upon an electric aircraft. As used in this disclosure, an "electrical charging current" is a flow of electrical charge that facilitates an increase in stored electrical energy of an energy storage, such as without limitation a power source. Power source 128 may include a plurality of batteries, battery modules, and/or battery cells. Power source 128 may be configured to store a range of electrical energy, for example, a range of between about 5 KWh and about 5,000 KWh. Power source 128 may house a variety of electrical components. In one embodiment, power source 128 may contain a solar inverter. Solar inverter may be configured to produce on-site power generation. In one embodiment, power generated from solar inverter may be stored in a power source. In some embodiments, power source 128 may include a used electric vehicle battery no longer fit for service in a vehicle. In some embodiments, power source 128 may include any component with the capability of recharging a power source 124 of electric vehicle 116. In some embodiments, power source 128 may include a constant voltage charger, a constant current charger, a taper current charger, a pulsed current charger, a negative pulse charger, an IUI charger, a trickle charger, and a float charger.

In one or more embodiments, power sources 124,128 may be one or more various types of batteries, such as a pouch cell battery, stack batteries, prismatic battery, lithium-ion cells, or the like. In one or more embodiments, power sources 124,128 may include a battery, flywheel, rechargeable battery, flow battery, glass battery, lithium-ion battery, ultra battery, and the like thereof. In one or more embodiments, power sources 124,128 may have high power density where electrical power and power source can usefully produce per unit of volume and/or mass is relatively high. As used in this disclosure, "electrical power" is a rate of electrical energy per unit time. A power source may include a device for which power that may be produced per unit of volume and/or mass has been optimized, for instance at an expense of maximal total specific energy density or power capacity. In one or more non-limiting exemplary embodiments, power source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A power source may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as a power source.

In one or more embodiments, each power source 124,128 may include a plurality of power sources. For example, and without limitation, power source may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least a power source may be based on individual battery cell performance or an extrapolation based on a measurement of at least an electrical parameter. In an embodiment where power source includes a plurality of battery cells, overall power output capacity may be dependent on electrical parameters of each individual cell. If one cell experiences high self-discharge during demand, power drawn from at least a power source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary power sources are disclosed in detail in U.S. patent application Ser. No. 16/948,157 and Ser. No. 16/048,140 both entitled "SYSTEM AND METHOD FOR HIGH ENERGY DENSITY BATTERY MODULE", which are incorporated in their entirety herein by reference.

In one or more embodiments, control circuit 120 may be configured to control one or more electrical charging current within a conductor and/or coolant flow within a hose of charger 104. In other embodiments, control circuit 120 may be configured to control electrical charging and/or coolant flow within the electric vehicle port of electrical vehicle 116. In one or more embodiments, control circuit 120 may be a controller. As used in this disclosure, a "controller" is a logic circuit, such as an application-specific integrated circuit (ASIC), FPGA, comparator, Op-amp current source circuit, microcontroller, computing device, any combination thereof, and the like, that is configured to control a system and/or subsystem. For example, controller may be configured to control a coolant source 148, a ventilation component 152, power source 128, or any other charger component. In some embodiments, controller may control coolant source 148 and/or charger power source 128 according to disablement command 144. In some embodiments, disablement command 144 may be analog. In some cases, disablement command 144 may be digital. In one or more embodiments, disablement command 144 may be communicated according to one or more communication protocols, for example without limitation Ethernet, universal asynchronous receiver-transmitter, and the like. In some cases, disablement command 144 may be a serial signal. In some cases, disablement command may be a parallel signal. Disablement command 144 may be communicated by way of a network, for example a controller area network (CAN). In some cases, disablement command 144 may include commands to operate one or more of coolant sources 148, ventilation components 152, and/or charger power sources 128. For example, and without limitation, coolant source 148 may include a valve to control coolant flow and control circuit 120 may be configured to control the valve by way of disablement command 144. In some cases, coolant source 148 may include a flow source (e.g., a pump, a fan, or the like) and control circuit 120 may be configured to control the flow source by way of a disablement command. For example, and without limitation, control circuit 120 may turn off a flow source of charger 104 via disablement command 144. In another example, control circuit 120 may command electrical vehicle 116 to sever electrical connection to charger 104. In some case, power source 104 may include one or more circuits configured to provide a variable current source to provide electric charging current, for example, an active current source. Non-limiting examples of active current sources include active current sources without negative feedback, such as current-stable nonlinear implementation circuits, following voltage implementation circuits, voltage compensation implementation circuits, and current compensation implementation circuits, and current sources with negative feedback, including simple transistor current sources, such as constant currant diodes, Zener diode current source circuits, LED current source circuits, transistor current, and the like, Op-amp current source circuits, voltage regulator circuits, and curpistor tubes, to name a few. In one or more embodiments, one or more circuits within charger 104 or within electric vehicle 116. are configured to affect electrical charging current according to disruption element 140 from control circuit 120, such that control circuit 120 may control at least a parameter of the electrical charging current, such as an ON and OFF of circuits. For instance, and without limitation, control circuit 120 may control one or more of current (Amps), potential (Volts), and/or power (Watts) of electrical charging current by way of disruption command 144. For example, control circuit 120 may be configured to selectively engage electrical charging current, for example, ON or OFF by way of disruption command 144. In one or more embodiments, control circuit 120 is configured to provide protection to prevent damage to electric vehicle 116, charger 104, and/or injury to personnel by providing an immediate shutdown, such as an emergency shutdown, of charging connection 112. For example, in some cases, control circuit 120 may be configured to start and/or stop coolant flow and/or charging current under normal and/or abnormal conditions. In some cases, control circuit 120 may include a user interface. User interface may allow personnel to interface with control circuit 120 and thereby control any system and/or subsystem of charger 104, including but not limited to coolant source 148 and charger power source 128. In other embodiments, user interface may allow personnel to interface with control circuit 120 and thereby control any system of electric vehicle 116. In some cases, user interface may be configured to communicate information, such as without limitation charging data and/or disruption element to personnel. For example, and without limitation, user interface may provide indications when charger 104 or electric vehicle 116 needs servicing after control circuit 120 has transmitted disablement command 144 to disable charging connection 112 and, for example, turn off power and/or stop coolant flow.

With continued reference to FIG. 1, in some embodiments, charger 104 may include a connector configured to connect to port of electric vehicle 116 to create charging connection 112. In such a case, connector of charger 104 may be configured to be in electric communication and/or mechanic communication with port of electric vehicle 116. In other embodiments, charging connection 112 between charger 104 and electric vehicle 116 may be wireless, such as via induction for an electric communication or via wireless signals for an informatic communication. In other embodiments, a hose of charger 104 may be configured to be in fluidic communication with a port of electric vehicle 116. For example, and without limitation, hose may facilitate fluidic communication between coolant source 148 and vehicle power source 124 when connector is connected to port. In one or more embodiments, coolant source 148 may pre-condition aircraft power source 124. As used in this disclosure, "pre-conditioning" is an act of affecting a characteristic of a power source, for example power source temperature, pressure, humidity, swell, and the like, substantially prior to charging. In some cases, coolant source may be configured to pre-condition at least electric vehicle power source 124 prior to charging, by providing a coolant flow to the power source of the electric vehicle and raising and/or lowering temperature of the power source. Connector of charger 104 may include a seal configured to seal coolant. In some cases, seal may include at least one of a gasket, an O-ring, a mechanical fit (e.g., press fit or interference fit), and the like. In one or more embodiments, sensor 108 may detect a charging characteristic of seal. For example, and without limitation, if seal is leaking coolant, sensor 108 may detect a pressure charging characteristic, generate a charging datum related to the detected pressure, and transmit charging datum to control circuit 120. Control circuit 120 may then determine a disruption element as a function of the pressure charging datum and a preconfigured pressure threshold for coolant flow. Charging datum may be determined to be outside of preconfigured threshold and thus control circuit 120 may disable charging connection as a safety measure, such as by shutting off coolant flow through hose.

Still referring to FIG. 1, sensor 108 may be configured to detect an attachment of charger 104 with an electric vehicle port, and transmit charging datum 136 to control circuit 120. For example, and without limitation, charging datum 136 may include a signal confirming that a connector of charger 104 and a port of electric vehicle 116 have failed to properly interlock. In some embodiments, sensor 108 may include a proximity sensor that generates a proximity signal and transmits the proximity signal to control circuit 120 as a function of the charging datum. In another example, and without limitation, connector may be coupled to a proximity signal conductor. As used in this disclosure, an "proximity signal conductor" is a conductor configured to carry a proximity signal. As used in this disclosure, a "proximity signal" is a signal that is indicative of information about a location of connector. Proximity signal may be indicative of attachment of connector with a port, for instance electric vehicle port. In some cases, a proximity signal may include an analog signal, a digital signal, an electrical signal, an optical signal, a fluidic signal, or the like. In embodiments, a proximity signal conductor may be configured to conduct a proximity signal indicative of attachment between connector and an electric vehicle port. In one or more non-limiting exemplary embodiments, control circuit 120 may be configured to receive charging datum including a proximity signal from sensor 108, which may include a proximity sensor. Proximity sensor may be electrically communicative with a proximity signal conductor. Proximity sensor may be configured to generate a proximity signal as a function of connection between connector and electric vehicle port. As used in this disclosure, a "proximity sensor" is a sensor that is configured to detect at least a phenomenon related to connecter being mated to a port. Proximity sensor may include any sensor described in this disclosure, including without limitation a switch, a capacitive sensor, a capacitive displacement sensor, a doppler effect sensor, an inductive sensor, a magnetic sensor, an optical sensor (such as without limitation a photoelectric sensor, a photocell, a laser rangefinder, a passive charge-coupled device, a passive thermal infrared sensor, and the like), a radar sensor, a reflection sensor, a sonar sensor, an ultrasonic sensor, fiber optics sensor, a Hall effect sensor, and the like. In one or more non-limiting exemplary embodiments, if control circuit 120 determines a disruption element as a function of proximity charging datum, then control circuit may disable a charging connection, such as turn off a power supply to charger 104 and thus turn off a power supply to electric vehicle 116.

With continued reference to FIG. 1, connector may include a coolant flow path. Coolant flow path may have a distal end located substantially at connector 100. As used in this disclosure, a "coolant flow path" is a component that is substantially impermeable to a coolant and contains and/or directs a coolant flow. As used in this disclosure, "coolant" may include any flowable heat transfer medium. Coolant may include a liquid, a gas, a solid, and/or a fluid. Coolant may include a compressible fluid and/or a non-compressible fluid. Coolant may include a non-electrically conductive liquid such as a fluorocarbon-based fluid, such as without limitation Fluorinert™ from 3M of Saint Paul, Minnesota, USA. In some cases, coolant may include air. As used in this disclosure, a "flow of coolant" is a stream of coolant. In some cases, coolant may include a fluid and coolant flow is a fluid flow. Alternatively or additionally, in some cases, coolant may include a solid (e.g., bulk material) and coolant flow may include motion of the solid. Exemplary forms of mechanical motion for bulk materials include fluidized flow, augers, conveyors, slumping, sliding, rolling, and the like. Coolant flow path may be in fluidic communication with a coolant source 138. As used in this disclosure, a "coolant source" is an origin, generator, reservoir, or flow producer of coolant. In some cases, a coolant source may include a flow producer, such as a fan and/or a pump. Coolant source may include any of following non-limiting examples, air conditioner, refrigerator, heat exchanger, pump, fan, expansion valve, and the like.

Still referring to FIG. 1, in some embodiments, coolant source 148 may be further configured to transfer heat between coolant, for example coolant belonging to coolant flow, and an ambient air. As used in this disclosure, "ambient air" is air which is proximal a system and/or subsystem, for instance the air in an environment which a system and/or sub-system is operating. For example, in some cases, coolant source comprises a heart transfer device between coolant and ambient air. Exemplary heat transfer devices include, without limitation, chillers, Peltier junctions, heat pumps, refrigeration, air conditioning, expansion or throttle valves, heat exchangers (air-to-air heat exchangers, air-to-liquid heat exchangers, shell-tube heat exchangers, and the like), vapor-compression cycle system, vapor absorption cycle system, gas cycle system, Stirling engine, reverse Carnot cycle system, and the like. In some versions, computing device 104 may be further configured to control a temperature of coolant. For instance, in some cases, a sensor may be located within thermal communication with coolant, such that sensor is able to detect, measure, or otherwise quantify temperature of coolant within a certain acceptable level of precision. In some cases, sensor may include a thermometer. Exemplary thermometers include without limitation, pyrometers, infrared non-contacting thermometers, thermistors, thermocouples, and the like. In some cases, thermometer may transduce coolant temperature to a coolant temperature signal and transmit the coolant temperature signal to control circuit 120. Control circuit 120 may receive coolant temperature charging datum and determine if there is a disruption element as a function of the coolant temperature charging datum. If control circuit 120 determines such a charging datum, control circuit may disable charging connection by, for example, turning off coolant flow through connector. Control circuit 120 may use any control method and/or algorithm used in this disclosure to control charging connection 112, including without limitation proportional control, proportional-integral control, proportional-integral-derivative control, and the like.

Still referring to FIG. 1, charger 104 may include ventilation component 152. Ventilation component 152 may be configured to lead a flow of air and/or airborne particles away from charger 104 and/or electric vehicle 116. In some embodiments, ventilation component 152 may include a ventilation ducting system. A "ventilation component" as used in this disclosure is a group of holes configured to permit a flow of air away or towards an object. In some embodiments, a ventilation ducting system may be configured to direct a flow of heated air away from charger 104. In other embodiments, a ventilation ducting system may be configured to direct a flow of cool air to charger 104. In some embodiments, ventilation component 152 may include a plurality of exhaust devices, such as, but not limited to, vanes, blades, rotors, impellers, and the like. In some embodiments, an exhaust device of ventilation component 152 may be mechanically connected to a power source. In one or more embodiments, ventilation component 152 may have a charging connection with electric vehicle 116. In one or more exemplary embodiments, if control circuit 120 determines a disruption element related to the communication between ventilation component 152 and vehicle 116 as a function of, for example, temperature charging datum, then control circuit may disable charging connection between ventilation component 152 and electric vehicle 116 to avoid, for example, overheating of charger 104 and/or electric vehicle if ventilation component 152 is working improperly.

In other embodiments, charger 104 may include, but is not limited to, an electric vehicle recharging station, a ground support cart, an electric recharging point, a charging point, a charge point, an electronic charging station, electric vehicle supply equipment, and the like. For instance, and without limitation, charger may be consistent with disclosure of electric vehicle recharging component in U.S. patent application Ser. No. 17/361,911 and titled "RECHARGING STATION FOR ELECTRIC AIRCRAFTS AND A METHOD OF ITS USE", which is incorporated herein by reference in its entirety. In a non-limiting embodiment, charger 104 may further include a constant voltage charger, a constant current charger, a taper current charger, a pulsed current charger, a negative pulse charger, an IUI charger, a trickle charger and/or a float charger. In some embodiments, charger 104 may be configured to deliver power stored from a power storage unit. In some embodiments, charger 104 may be configured to connect to a power storage unit through a DC-to-DC converter. In one embodiment, charger 104 may be configured to connect to a power storage unit through a DC-to-DC converter. In another embodiment, two or more electric aircrafts may be charged by charger 104. As previously mentioned in this disclosure, charger 104 may further include a power source, such as a battery, that may further include a power supply unit. The power supply unit may be mechanically connected to charger 104. The power supply unit may have electrical components that may be configured to receive electrical power, which may include alternating current ("AC") and/or direct current ("DC") power, and output DC and/or AC power in a useable voltage, current, and/or frequency. In one embodiment, the power supply unit may include a power storage unit, which may be configured to store, for example, 500 kwh of electrical energy. Charger 104 may house a variety of electrical components. In one embodiment, charger 104 may contain a solar inverter. A solar inverter may be configured to produce on-site power generation. In one embodiment, power generated from a solar inverter may be stored in power storage unit of charger 104. In some embodiments, a power storage unit may include a used electric aircraft battery pack no longer fit for flight.

Still referring to FIG. 1, in one embodiment, charger 104 may include a plurality of connections to create a plurality of charging connections between charger 104 and electric vehicle 116 to comply with various electric vehicle needs. In one embodiment, charger 104 may connect to manned and unmanned electric vehicles of various sizes, such as an eVTOL or a drone. In another embodiment, charger 104 may switch between power transfer standards such as the combined charging system standard (CCS) and CHAdeMO standards. In another embodiment, charger 104 may adapt to multiple demand response interfaces.

Still referring to FIG. 1, control circuit 120 may be further configured to prevent a second communication between charger 104 and electric vehicle 116. For example, and without limitation, if control circuit 120 determines a disruption element related to a voltage of vehicle power source 124, the control circuit may disable, for example, an electric communication and/or mechanic communication between charger 104 and electric vehicle 116. Control circuit 120 may then prevent, for example, a user from creating a new charging connection between the same electric vehicle or a different electric vehicle until the disruption element has been resolved and is no longer detected. For example, if a second aircraft lands on a helipad charger, the helipad charger will not create a charging connection with the second aircraft until the disruption element with the first aircraft has been resolved, such as by replacing a power source of the first electric aircraft. In one or more embodiments, charging connection may be reset so that charging connection 112 may be activated or restarted. For example, and without limitation, a user may manually override control circuit 120 and activate charging connection 112 to reestablish communication between charger 104 and electric vehicle 116. In another example, and without limitation, disruption element 140 may be resolved, such as a battery is allowed to cool to an acceptable temperature or a hose connection is properly sealed, and control circuit 120 may determine that there is no longer a disruption element present and thus automatically reactivate charging connection 112.

Referring now to FIG. 2, an embodiment of sensor suite 200 is presented in accordance with one or more embodiments of the present disclosure. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors communicatively connected to charging connection 112 measuring operating conditions of the communication such as temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of sensor 108 to detect phenomenon is maintained.

Sensor suite 200 includes a moisture sensor 204. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor 204 may be a hygrometer. Moisture sensor 204 may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 2, sensor suite 200 may include electrical sensors 208. Electrical sensors 208 may be configured to measure voltage of charging connection 112, electrical current of charging connection 112, and resistance of charging connection 112. Electrical sensors 208 may include separate sensors to measure each of the previously disclosed electrical characteristics such as voltmeter, ammeter, and ohmmeter, respectively.

Alternatively or additionally, and with continued reference to FIG. 2, sensor suite 200 may include a sensor or plurality thereof that may detect voltage and direct the charging of individual battery cells of a power source according to charge level; detection may be performed using any suitable component, set of components, and/or mechanism for direct or indirect measurement and/or detection of voltage levels, including without limitation comparators, analog to digital converters, any form of voltmeter, or the like. Sensor suite 200 and/or a control circuit incorporated therein and/or communicatively connected thereto may be configured to adjust charge to one or more battery cells as a function of a charge level and/or a detected parameter. For instance, and without limitation, sensor suite 200 may be configured to determine that a charge level of a battery cell of a power source is high based on a detected voltage level of that battery cell or portion of the power source and/or battery pack. Sensor suite 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. Sensor suite 200 may include digital sensors, analog sensors, or a combination thereof. Sensor suite 200 may include digital-to-analog converters (DAC), analog-to-digital converters (ADC, A/D, A-to-D), a combination thereof, and the like.

With continued reference to FIG. 2, sensor suite 200 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or combinations of sensors present within sensor suite 200, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

With continued reference to FIG. 2, sensor suite 200 may include a sensor configured to detect gas that may be emitted during or after a cell failure. "Cell failure", for the purposes of this disclosure, refers to a malfunction of a battery cell of a power source, which may be an electrochemical cell, that renders the cell inoperable for its designed function, namely providing electrical energy to at least a portion of an electric aircraft. Byproducts of cell failure 212 may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 200, may be configured to detect combustible, flammable, toxic, oxygen depleted, a combination thereof, or another type of gas alone or in combination. The gas sensor that may be present in sensor suite 200 may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. Sensor suite 200 may include sensors that are configured to detect non-gaseous byproducts of cell failure 212 including, in non-limiting examples, liquid chemical leaks including aqueous alkaline solution, ionomer, molten phosphoric acid, liquid electrolytes with redox shuttle and ionomer, and salt water, among others. Sensor suite 200 may include sensors that are configured to detect non-gaseous byproducts of cell failure 212 including, in non-limiting examples, electrical anomalies as detected by any of the previous disclosed sensors or components.

With continued reference to FIG. 2, sensors 208 may be disposed on a sense board 216. In one or more embodiments, sense board 216 may include opposing flat surfaces and may be configured to cover a portion of a battery module within a power source, such as a battery pack. Sense board 216 may include, without limitation, a control circuit configured to perform and/or direct any actions performed by sense board 216 and/or any other component and/or element described in this disclosure. Sense board 216 may be consistent with the sense board disclosed in U.S. patent application Ser. No. 16/948,140 entitled, "SYSTEM AND METHOD FOR HIGH ENERGY DENSITY BATTERY MODULE" and incorporated herein by reference in its entirety.

With continued reference to FIG. 2, sensor suite 200 may be configured to detect events where voltage nears an upper voltage threshold or lower voltage threshold. The upper voltage threshold may be stored in a memory of, for example, a computing device for comparison with an instant measurement taken by any combination of sensors present within sensor suite 200. The upper voltage threshold may be calculated and calibrated based on factors relating to battery cell health, maintenance history, location within battery pack, designed application, and type, among others. Sensor suite 200 may measure voltage at an instant, over a period of time, or periodically. Sensor suite 200 may be configured to operate at any of these detection modes, switch between modes, or simultaneous measure in more than one mode. Sensor 108 may detect through sensor suite 200 events where voltage nears the lower voltage threshold. The lower voltage threshold may indicate power loss to or from an individual battery cell or portion of the battery pack. Sensor 108 may detect through sensor suite 200 events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation. Additional disclosure related to a battery management system may be found in U.S. patent application Ser. No. 17/111,002 and Ser. No. 17/108,798 entitled "SYSTEMS AND METHODS FOR A BATTERY MANAGEMENT SYSTEM INTEGRATED IN A BATTERY PACK CONFIGURED FOR USE IN ELECTRIC AIRCRAFT", both of which are incorporated in their entirety herein by reference.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

Figure 3:
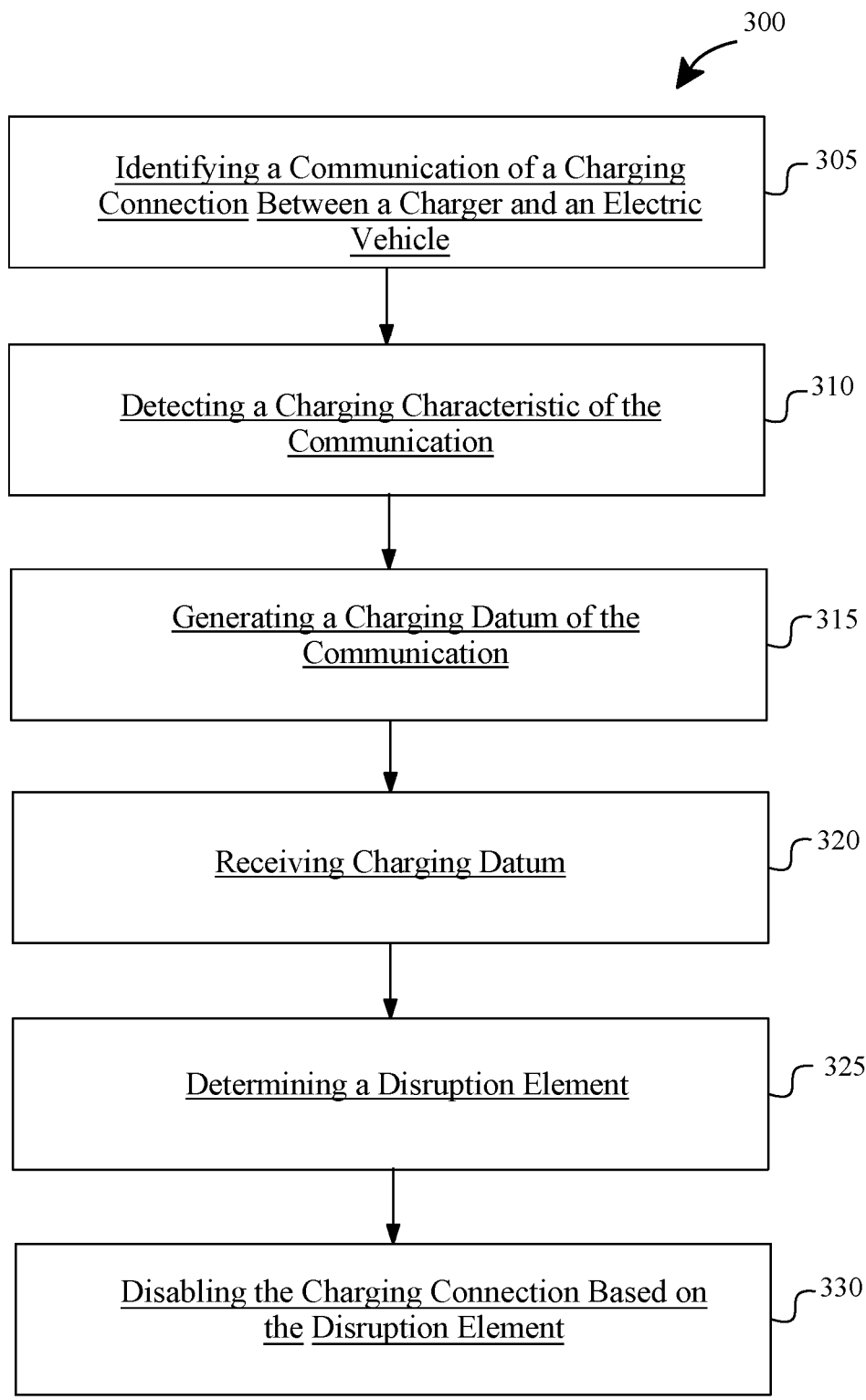
FIG. 3 is a flow diagram illustrating an exemplary method of a method for an immediate shutdown of charging for an electric vehicle charger in accordance with aspects of the invention thereof.

Now referring to FIG. 3, a flow chart of an exemplary method 300 for an immediate shutdown of charging for an electric vehicle charger is shown in accordance with one or more embodiments of the present disclosure. As shown in block 305, method 300 includes identifying, by sensor 108 communicatively connected to electric vehicle charging connection 112, communication of charging connection 112 between charger 104 and electric vehicle 116. In one or more embodiments, communication between charger 104 and electric vehicle 116 includes an electric communication. In other embodiments, communication between the charger and the electric vehicle includes a mechanic communication.

As shown in block 310, method 300 includes detecting, by sensor 108, a charging characteristic 132 of communication. As shown in block 315, method 300 includes generating, by sensor 108, charging datum based on charging characteristic 132. As shown in block 320, method 300 includes receiving, by a processor communicatively connected to sensor 108, charging datum *136 of sensor 108.

As shown in block 325, method 300 includes determining, by control circuit 120, disruption element 140 as a function of charging datum 136. As shown in block 330, method 300 includes disabling, by control circuit 120, charging connection 112 based on disruption element 140. In one or more embodiments, the disabling of charging connection 112 further includes terminating an electric communication between electric vehicle 116 and charger 104. In one or more embodiments, method 300 further includes reactivating, by control circuit 120, charging connection once disruption element 140 is resolved. In one or more embodiments, method 300 further includes generating, by the control circuit 120, disablement command 144. In one or more embodiments, method 3090 further includes preventing, by control circuit 120, a second communication between the charger and the electric vehicle. In one or more embodiments, electric vehicle 116 may be an electric aircraft.

Figure 4:
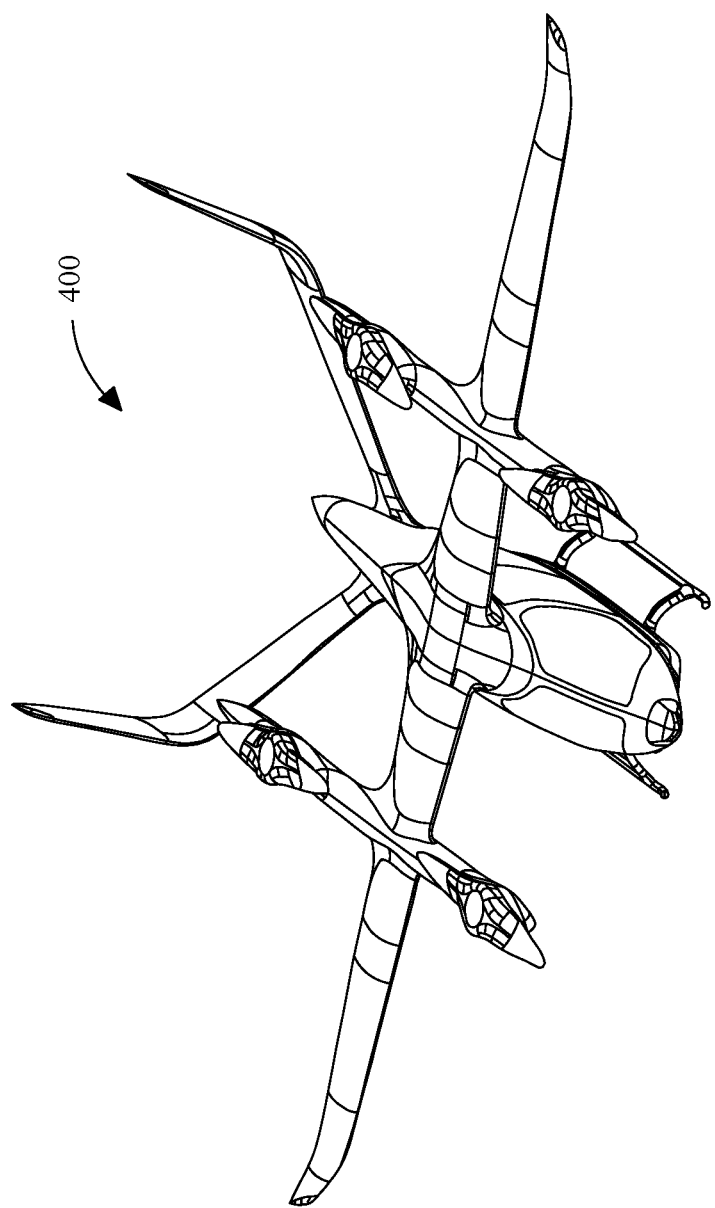
FIG. 4 is a diagrammatic representation illustrating an isometric view of an electric aircraft in accordance with aspects of the invention thereof.

Now referring to FIG. 4, an exemplary embodiment of an electric vehicle, such as electric aircraft 400, is shown in accordance with one or more embodiments of the present disclosure. In one or more embodiments, electric aircraft 400 may include a vertical takeoff and landing aircraft (eVTOL). As used herein, a "vertical take-off and landing (eVTOL) aircraft" is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight. In some embodiments, an eVTOL aircraft 400 includes at least an aircraft component. As used in this disclosure, an "aircraft component" is any part of an aircraft, for example without limitation pilot controls, sensors, flight components, propulsors, landing gear, and the like.

Still referring to FIG. 4, electric aircraft 400 may include a power source, such as a battery pack. As previously mentioned in this disclosure, a power source may include a battery pack, which is configured to store electrical energy in the form of a plurality of battery modules, which themselves include of a plurality of electrochemical cells also referred to herein as battery cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term "battery" is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same potential (measured in Volts) across any component in the circuit. Battery cells may be wired in a series-parallel circuit which combines characteristics of the constituent circuit types to this combination circuit.

Figure 5:
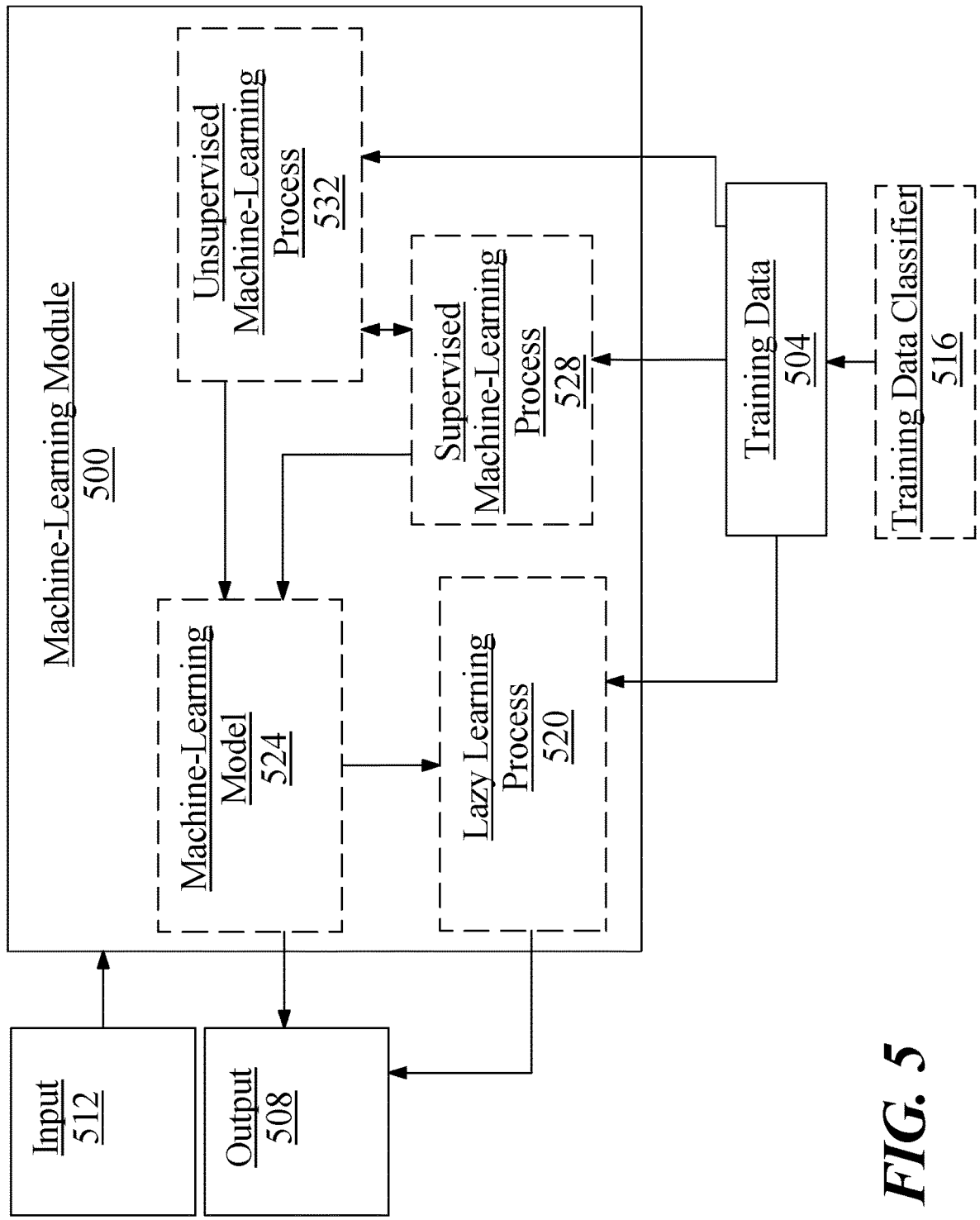
FIG. 5 is a block diagram illustrating an exemplary machine-learning module that can be used to implement any one or more of the methodologies disclosed in this disclosure and any one or more portions thereof in accordance with aspects of the invention thereof.

Referring now to FIG. 5, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine-learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example, charging datum 136 of sensor 108 may be an input and disruption element 140 and/or disablement command 144 may be an output.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a process whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Training data classifier may include, but not limited to, different levels or power capabilities of an electric grid, different levels of failure modes of an electric grid, and the like.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

In one or more embodiments, and without limitation, a disruption element may be determined as a function of at least charging datum 136. For example, and without limitation, a control circuit, such as computing device 516, may be configured to train an immediate shutdown machine-learning model using disruption training data, where the disruption training data includes a plurality of charging data elements correlated with threshold elements. Computing device 516 may then be configured to generate disruption element as a function of the immediate shutdown machine-learning model. For example, and without limitation, immediate shutdown machine-learning model may relate charging data with one or more preconfigured thresholds to determine a corresponding disruption element and related disablement command.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include operating states, flight elements, and/or pilot signals as described above as inputs, autonomous functions as outputs, and a scoring function representing a desired form of relationship to be detected between inputs and outputs. Scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine-learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
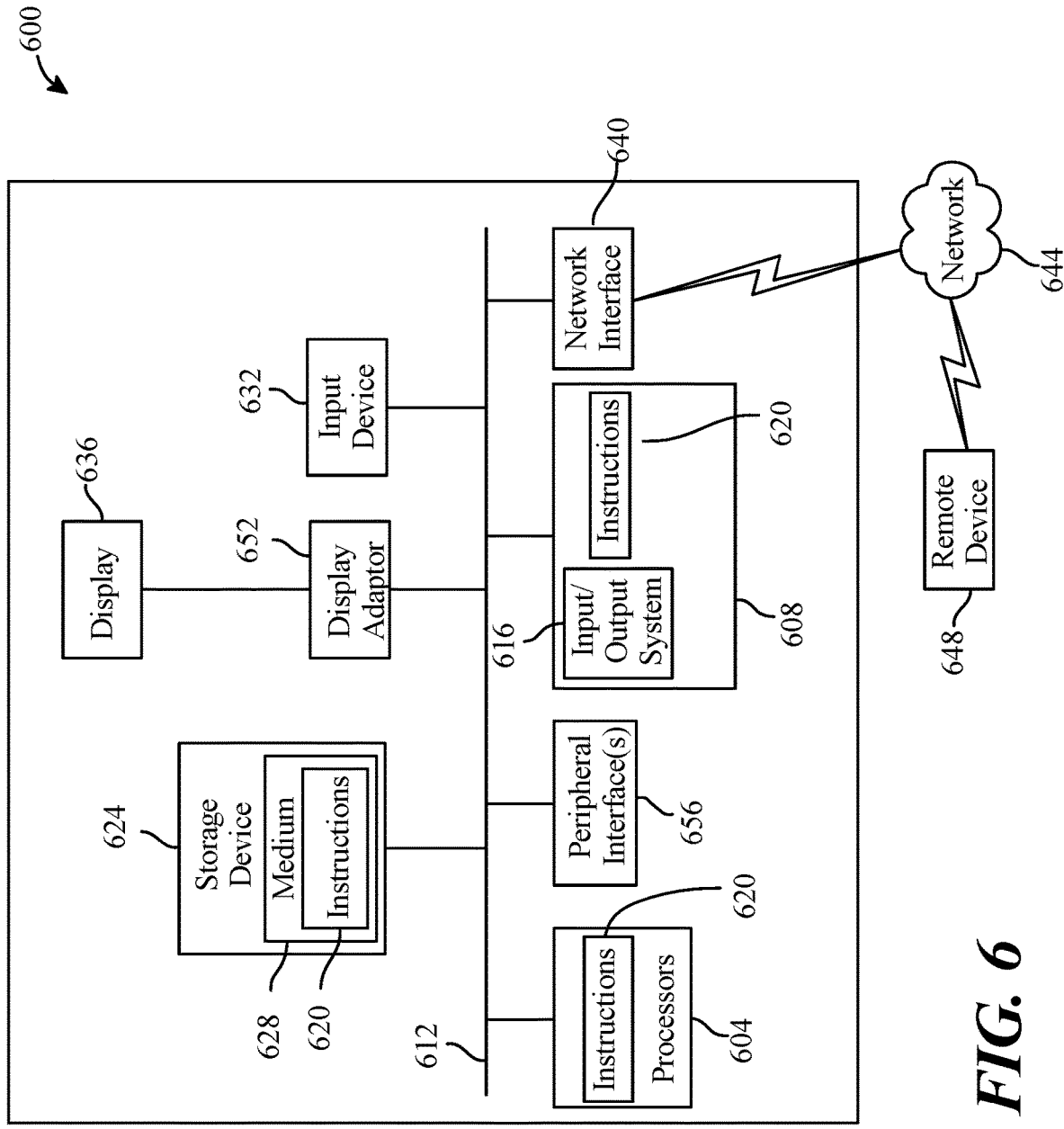
FIG. 6 is a block diagram of a computing device in accordance with aspects of the invention thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for an immediate shutdown of charging for an electric aircraft, the system comprising:
 a sensor communicatively connected to an electric vehicle charging connection between a charger and an electric aircraft, wherein the sensor is configured to:
  identify an electric communication of the charging connection;
  detect a charging characteristic of the electric communication; and
  generate a charging datum based on the charging characteristic, wherein the charging datum includes a temperature of a flow of coolant passing through the charging connection; and
 a control circuit included in the electric aircraft that is communicatively connected to the sensor, the control circuit configured to:

receive the charging datum from the sensor;
determine a disruption element as a function of the charging datum; and
disable the charging connection between the charger and the electric aircraft based on the disruption element, wherein disabling the charging connection includes terminating the electric communication of the charging connection and terminating the flow of coolant passing through the charging connection between the charger and the electric aircraft.

2. The system of claim 1, wherein the charging datum further identifies a state of charge of a power source component of the electric aircraft.

3. The system of claim 1, wherein the communication of the charging connection further comprises a mechanical communication.

4. The system of claim 1, wherein the disruption element comprises a charging failure of the electric aircraft.

5. The system of claim 1, wherein the control circuit is further configured to generate a disablement command.

6. The system of claim 1, wherein the control circuit is further configured to prevent a second communication between the charger and the electric aircraft.

7. The system of claim 1, wherein the control circuit is further configured to reactivate the charging connection once the disruption element is resolved.

8. The system of claim 1, wherein the control circuit is configured to terminate the charging by terminating an electrical connection to a charging port.

9. The system of claim 1, where the control circuit is further configured to notify a user of the disruption element.

10. The system of claim 1, wherein the electric aircraft is an electric vertical take-off and landing aircraft.

11. A method for an immediate shutdown of charging an electric aircraft, the method comprising:

identifying, by a sensor communicatively connected to an electric aircraft charging connection, an electric communication between a charger and an electric aircraft;
detecting, by the sensor, a charging characteristic of the electric communication;
generating, by the sensor, a charging datum based on the charging characteristic, wherein the charging datum includes a temperature of a flow of coolant passing through the charging connection;
receiving, by a control circuit within the aircraft that is communicatively connected to the sensor, the charging datum from the sensor;
determining, by the control circuit, a disruption element as a function of the charging datum; and
disabling, by the control circuit, the charging connection between the charger and the electric aircraft based on the disruption element, wherein disabling the charging connection includes terminating the electric communication of the charging connection and terminating the flow of coolant passing through the charging connection between the charger and the electric aircraft.

12. The method of claim 11, wherein the communication of the charging connection between the charger and the electric aircraft further comprises a mechanical communication.

13. The method of claim 11, further comprising reactivating, by the control circuit, the charging connection once the disruption element is resolved.

14. The method of claim 11, further comprising generating, by the control circuit, a disablement command.

15. The method of claim 11, preventing, by the control circuit, a second communication between the charger and the electric aircraft.

16. The method of claim 11, wherein the electric aircraft is an electric vertical take-off and landing aircraft.

* * * * *